US006608887B1

(12) United States Patent
Reksten et al.

(10) Patent No.: US 6,608,887 B1
(45) Date of Patent: Aug. 19, 2003

(54) VOICE MESSAGING SYSTEM WITH ABILITY TO PREVENT HUNG CALLS

(75) Inventors: Harald Samuel Reksten, Hockessin, DE (US); Jonathan Paul Davis, Downingtown, PA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/451,077

(22) Filed: Nov. 30, 1999

(51) Int. Cl.[7] ................................................ H04M 1/64
(52) U.S. Cl. ...................... 379/67.1; 379/81; 379/88.07; 379/88.13; 379/88.2; 379/88.21; 379/88.25
(58) Field of Search ...................... 379/67.1, 81, 88.07, 379/88.22, 88.25, 88.08, 93.31, 100.05, 72, 73, 84, 88.04, 88.12, 88.13, 88.14, 88.17, 88.18, 88.19, 88.2, 88.21, 93.35

(56) References Cited

U.S. PATENT DOCUMENTS

| 4,386,400 A | * | 5/1983 | Cope et al. ................. 364/200 |
| 4,794,589 A | * | 12/1988 | Finch et al. ................. 370/60 |
| 5,581,600 A | * | 12/1996 | Watts et al. ................ 379/67.1 |
| 5,581,612 A |  | 12/1996 | Nishikawa ................... 379/387 |
| 5,629,926 A |  | 5/1997 | Deutsch et al. .............. 370/252 |
| 5,652,789 A | * | 7/1997 | Miner et al. ................ 379/201 |
| 5,764,752 A |  | 6/1998 | Waite et al. ................ 379/377 |
| 5,787,164 A |  | 7/1998 | Haines et al. ............... 379/372 |
| 5,812,644 A | * | 9/1998 | Bowater et al. ......... 379/93.14 |
| 5,828,697 A |  | 10/1998 | Shin ........................... 375/222 |
| 6,330,079 B1 | * | 12/2001 | Dugan et al. ............... 358/403 |

* cited by examiner

Primary Examiner—Allan Hoosain
(74) Attorney, Agent, or Firm—Michael B. Atlass; Mark T. Starr; Woodcock Washburn LLP

(57) ABSTRACT

A method and system for preventing hung calls on a channel of a network interface device of a voice messaging system is described. A channel of the network interface device receives a new incoming call from the telephone network. If no other call is in progress on the same channel as the one on which the new call was received, the new incoming call is accepted. On the other hand, if another call is already in progress on this channel, the other call is terminated and the new incoming call is rejected. At this point, the network interface device is ready to accept any subsequent calls received on that channel.

24 Claims, 3 Drawing Sheets

VOICE MESSAGING SYSTEM WITH ABILITY TO PREVENT HUNG CALLS

FIELD OF THE INVENTION

The present invention relates generally to voice messaging systems, and more particularly to a multiple node messaging system wherein each Network Interface Unit or Telephony Services Platform (which is a form of Network Interface Unit) is shared by two or more host computers. Still more particularly, the present invention concerns a voice messaging system including a mechanism for preventing channels from being hung so completely that they can not be recovered. The invention also prevents cross connection of calls such that a customer using a given channel can find himself listening to someone else's call.

BACKGROUND OF THE INVENTION

Messaging systems that provide voice, fax and/or e-mail messaging capabilities are well known. FIG. 1 illustrates an exemplary prior art messaging system developed by Unisys Corporation, Blue Bell, Pa., the assignee of the present invention. The system of FIG. 1 comprises multiple servers (which may be implemented, e.g., with A-series or Clearpath™ computers offered by Unisys Corporation) each supporting a network applications platform (NAP), which provides an underlying platform for storage and retrieval of messages, and a messaging application running on the platform. A voice mail application, such as the Unisys Universal Voice Messaging System (UVMS), is an example of a messaging application that runs on the messaging platform. The UVMS application determines how calls to the messaging system are handled, what prompts are played to callers, and which features are available. Such applications typically maintain a database of subscribers who have "mailboxes" on the system. The messaging platform interfaces to a telephone network through a Network Interface Unit (NIU). Received messages are stored by the messaging platform in a local message store, or voice file.

The network applications platform, or NAP, may be located at a local telephone company connected to one or more central offices or switches, or could alternatively be located on the premises of a customer, such as a large or medium-sized company. In the latter case, the NAP would typically be connected to a private branch exchange (PBX) instead of directly to a PSTN. Telephone customers typically demand high (close to 100%) system availability, which means that, for a large customer having hundreds or even thousands of employees at a given location, it is extremely difficult to take the telephony application off-line for even a short time to make updates or modifications. Therefore, when it becomes necessary to modify the application in any way, the application provider needs a way to make such modifications in a way that maintains system availability. This need is particularly severe for high volume telephony systems, which typically cannot be taken out of service without inconveniencing significant numbers of users.

Network Interface Units are available from a number of different vendors. For example, NIUs suitable for use with the present invention include: (a) the Telephony Services Platform available from Unisys Corporation, Blue Bell, Pa.; (b) the Summa Four VCO 80 available from Summa Four, Inc., Manchester, N.H.; and (c) the Voice Frame 2020 available from Harris Corporation, Melbourne, Fla. The Telephony Services Platform (TSP) is most preferred. The difference between it and the other products just mentioned is that the TSP includes a board that plays back digitized voice from a voice file whereas the other products require a separate playback module.

In use, if a subscriber is not available when an incoming call is received, the Public Switched Telephone Network (PSTN) forwards the call to the messaging system, which typically allows the caller to record a message, and then will store the message for later retrieval by the subscriber. A key (or token) returned to the messaging application uniquely identifies the stored message data within the message store. This key can be used at a later time to retrieve the message from the message store for playback to the subscriber.

In the exemplary system shown in FIG. 1, a first node of the system comprises a server/NAP 10$a$, voice file and database 12$a$ and NIU 14$a$. Similarly, a second node comprises a server/NAP 10$b$, voice file and database 12$b$ and NIU 14$b$; and a third node comprises a server/NAP 10$c$, voice file and database 12$c$ and NIU 14$c$. The first node, e.g., could be responsible for a predefined geographic area encompassing hundreds of thousands of subscribers, or simply for a predefined set of telephone lines or circuits. The respective nodes are separately coupled to a public switched telephone network, or PSTN, 16, and are thereby made accessible to their subscribers. Moreover, subscribers of one node can employ messaging to transfer copies of messages (such as voice messages) to subscribers of another node. The respective nodes may or may not share access to each other's voice files (see copending application Ser. No. 09/161,214, filed Sep. 25, 1998, "Multiple Node Messaging System Wherein Nodes Have Shared Access To Message Stores Of Other Nodes").

An important characteristic of a messaging system is that it be highly reliable and able to quickly recover from system failures. This characteristic is generally referred to as system "availability." The present invention relates to a messaging system architecture that comprises an NIU and a messaging platform (such as NAP). In such a system, normal processing by the NIU and messaging platform on a given channel can become corrupted due to some failure in either the NIU or the messaging platform. This is commonly referred to as a "protocol violation." In this situation, the channel on which the protocol violation occurred, or a call on that channel, may become "hung." The NIU and messaging platform may be unaware that the channel is hung, and may continue to operate as if an existing call is in progress on that channel. However, the telephone network may have long since terminated the actual call on the corresponding voice channel of the telephone network. If a new call comes in from the telephone network on that same channel, it cannot be processed because the corresponding channel in the NIU is hung. The present invention provides a mechanism for preventing such hung calls/channels.

Further background information concerning the construction and operation of messaging systems, and particularly systems employing a Network Applications Platform (NAP) for interfacing a telephone network and network applications running on an enterprise server, may be found in the following patents and copending patent applications, which are hereby incorporated by reference:

U.S. Pat. No. 5,133,004, Jul. 21, 1992, "Digital Computer Platform for Supporting Telephone Network Applications";

U.S. Pat. No. 5,138,710, Aug. 11, 1992, "Apparatus and Method for Providing Recoverability in Mass Storage Data Base Systems Without Audit Trail Mechanisms";

U.S. Pat. No. 5,384,829, Jan. 24, 1995, "Digital Computer Platform for Supporting Telephone Network Applications";

U.S. Pat. No. 5,323,450, Jun. 21, 1994, "Telephone Network Applications Platform for Supporting Facsimile Applications";

U.S. Pat. No. 5,494,606, Feb. 20, 1996, "Multi-Lingual Prompt Management System for a Network Applications Platform";

U.S. Pat. No. 5,633,916, May 27, 1997, "Universal Messaging Service Using Single Voice Grade Telephone Line Within a Client/Server Architecture";

U.S. patent application Ser. No. 08/944,924, filed Oct. 6, 1997, "Enhanced Multi-Lingual Prompt Management in a Voice Messaging System With Support for Speech Recognition";

U.S. patent application Ser. No. 08/964,744, filed Nov. 5, 1997, "Methods and Apparatus for Providing External Access to Executable Call Flows of a Network Application";

U.S. patent application Ser. No. 08/987,571, filed Dec. 11, 1997, "Multiple Language Electronic Mail Notification of Received Voice and/or Fax Messages";

U.S. patent application Ser. No. 09/094,126, filed Jun. 9, 1998, titled "Universal Messaging System Providing Integrated Voice, Data and Fax Messaging Services to PC/Web-based Clients, Including a Session Manager for Maintaining a Session Between a Messaging Platform and the Web-based Clients";

U.S. patent application Ser. No. 09/093,593, filed Jun. 9, 1998, titled "Universal Messaging System Providing Integrated Voice, Data and Fax Messaging Services to PC/Web-based Clients, Including a Content Manager for Receiving Information from Content Providers and Formatting the Same into Multimedia Containers for Distribution to Web-based Clients";

U.S. patent application Ser. No. 09/094,266, filed Jun. 9, 1998, titled "Universal Messaging System Providing Integrated Voice, Data and Fax Messaging Services to PC/Web-based Clients, Including a Large Object Server for Efficiently Distributing Voice/Fax Messages to Web-based Clients";

U.S. patent application Ser. No. 09/094,026, filed Jun. 9, 1998, "System and Method for Integrating Notification Functions of Two Messaging Systems in a Universal Messaging Solution";

U.S. patent application Ser. No. 09/161,214, filed Sep. 25, 1998, "Multiple Node Messaging System Wherein Nodes Have Shared Access To Message Stores Of Other Nodes"; and U.S. patent application Ser. No. 09/307,014, filed May 7, 1999, "Inter-System Call Transfer".

SUMMARY OF THE INVENTION

As discussed above, the present invention may be utilized to provide a "high availability" messaging system comprising network interface devices (NIDs), such as TSPs or NIUs (the terms TSP and NIU are considered synonymous in the context of the present invention), that are shared by a number of host computers. The present invention is not limited to the specific interface device architectures disclosed herein, and so the term "network interface device" is intended to encompass NIUs in general as well as the TSP employed in the preferred embodiments.

The present invention is most suitably used in a voice messaging system of the type in which a caller attempting to reach a voice messaging system subscriber can leave a voice-mail message for the subscriber, for example, in the event that the subscriber is not able to take the call. The message database and message handling capabilities of the system are provided by a voice messaging platform, which typically comprises a fairly large computer system. For example, Unisys Corporation, the assignee of the present invention, manufactures a voice messaging system in which its Clearpath NX computer serves as the messaging platform. In that system, a "network application," which defines the call flows of the voice messaging system, runs on top of Voice Network Management System (VNMS) software on the messaging platform.

A network interface device, or NID, serves as the interface between the public telephone network and the messaging platform. Calls coming in from voice channels of the telephone network are routed to pre-assigned channels in the NID. The messaging platform and NID assign a unique Call ID to each new incoming call.

Because each channel in the NID is pre-assigned to a particular voice channel of the telephone network, in normal operation the NID should never receive a new call on a channel that is already processing an existing call. (Note that the telephone network carries only one call on a given voice channel at a time.) However, as discussed above, normal processing by the ND and messaging platform can become corrupted due to a failure in either the NID or the messaging platform. The present inventors have developed a protocol that can be implemented in the NID and messaging platform to prevent a channel in which a protocol violation has occurred from being hung for long periods of time.

According to the invention, when a new call is received by the NID on a given channel, the NID first determines from its internal state whether a call is already in progress on that channel. Recall that, in normal operation, this should never occur because the telephone network does not carry more than one call on a particular voice channel. If the NID determines that there is no existing call on the channel, then the new call is accepted and normal processing of that call proceeds. If, however, the NID determines that a different call is already in progress, the invention requires that the NID, being unable to determine which of the calls is in error, terminate the call in progress at both the NID and the messaging platform. Additionally, the new incoming call is rejected. While this results in the loss of the incoming call, subsequent calls on that channel will now be processed properly.

Other features of the present invention are disclosed below.

BRIEF DESCRIPTION OF THE DRAWINGS

The foregoing summary and the following detailed description of presently preferred embodiments are better understood when read in conjunction with the appended drawings, in which.

DETAILED DESCRIPTION OF PREFERRED EMBODIMENTS

Overview

An exemplary embodiment of the present invention provides a NAP-based messaging system with improved availability. This improved availability accounts for outages due to all types of failures and also includes software/hardware upgrades. The ability to prevent hung calls of the present invention represents an important step toward the goal of improved availability.

Figure 1:
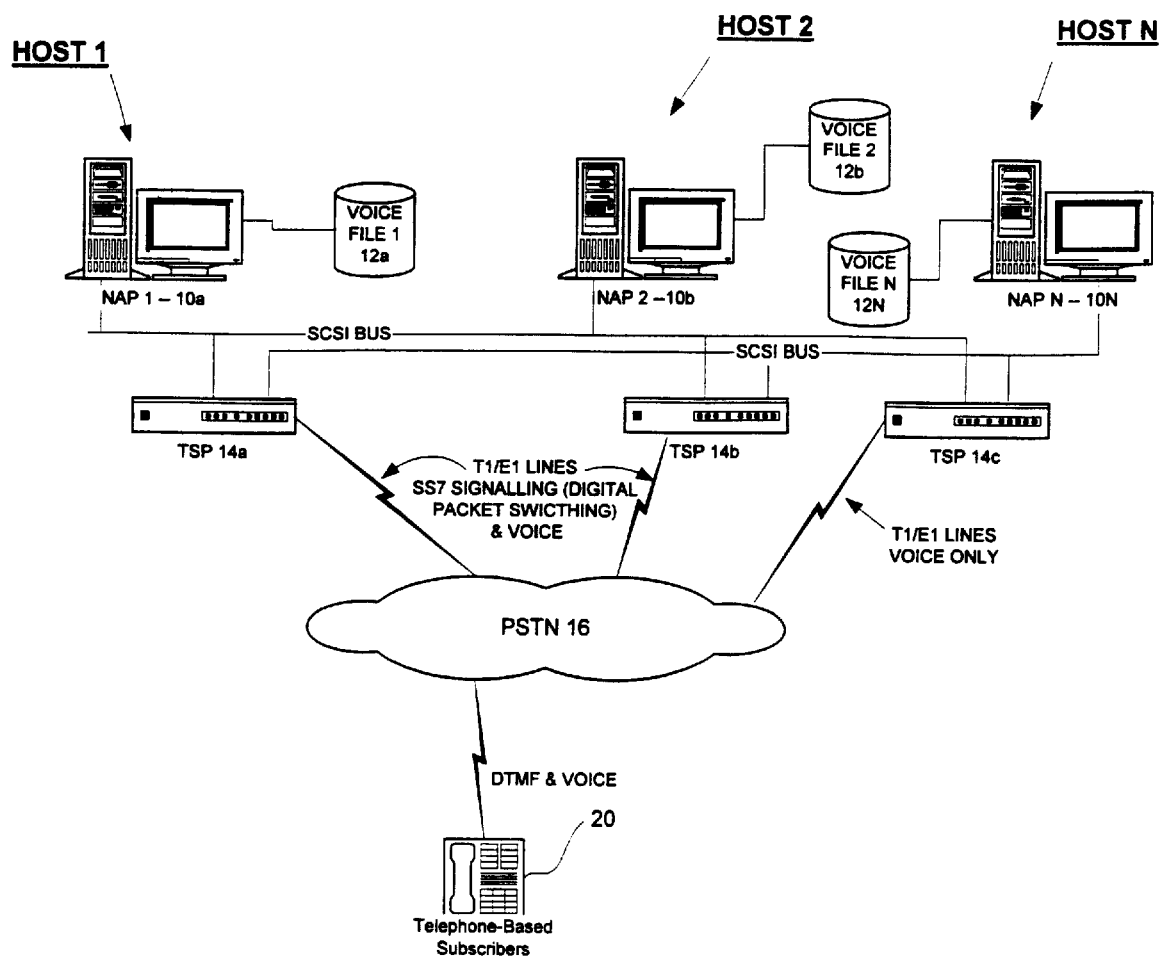
FIG. 1 schematically depicts a presently preferred shared TSP implementation of a messaging system in accordance with the present invention.

One presently preferred embodiment of the inventive system is shown in FIG. 1. As shown, one or more telephone-based subscribers 20 have access via a PSTN 16 to a set of TSPs 14. In this example, the PSTN communicates with the TSPs over T1/E1 lines using SS7 signaling (Signaling System 7 is an industry standard employing digital packet switching) and digital or analog voice signals. The TSPs are each coupled via a bus (in this case a Small Computer System Interface, or SCSI, bus) to a NAP-based host computer. For example, TSP 14a is coupled to Host 1, Host 2 and Host N; TSP 14b is similarly coupled to Host 1, Host 2 and Host N; and TSP 14c is coupled to Host N. (The intent of the terminology "Host 1," "Host 2" and "Host N" is to show that a call can be transferred from a specific host to one of N hosts, where N is an integer greater than 1.) The number of hosts that can share a cluster of TSPs is limited by the particular hardware employed to implement the invention. In one exemplary embodiment, described in greater detail below, the actual number of hosts is 255. The limits imposed on the number of hosts are physical limits and are based, in this example, on SCSI connectivity, such as the number of initiators and targets that can share a SCSI bus and the number of SCSI connections to a TSP.

The ability to prevent hung calls feature of the present invention is described below in greater detail with reference to the presently preferred method depicted in FIG. 3. First, however, since the Network Applications Platform, or NAP, is a central part of the presently preferred implementation of the invention, we will provide a brief summary description of the NAP.

The Network Applications Platform

U.S. Pat. No. 5,133,004, Jul. 21, 1992, titled "Digital Computer Platform for Supporting Telephone Network Applications," discloses a Network Applications Platform that may be used in implementing the present invention. The disclosure of this patent represents part of the background of the present invention, and thus is summarized below. The reader may review the patent itself for a complete description of the NAP. In addition, U.S. Pat. No. 5,323,450, dated Jun. 21, 1994, may be reviewed for background.

The variety of telephone services currently available include call answer, call forward, voice store and forward, voice-mail, emergency number facilities, directory assistance, operator assistance, call screening, and automatic wake-up services. Such services had generally been provided by dedicated systems specifically designed for the service and the hardware environment in which the system was to be deployed, which made the systems inflexible and expensive. Following divestiture, the Bell Operating Companies (BOCs) and Independent Telephone Companies (Telcos), in devising ways to increase the return on their installed telephone networks, began to offer new services that integrated into, or interfaced with, the existing network, resulting in greater utilization of the network. The invention disclosed in U.S. Pat. No. 5,133,004 made it easier for the BOCs and Telcos to provide new services by removing the dependence on the telephone switch provider in implementing these new services. In particular, the Network Applications Platform, or NAP, was designed to interface with the telephone network and support application software deployed by the BOCs and Telcos to provide services they wanted to offer.

The NAP is a digital computer platform that interfaces with the network and is programmed with software providing the telephone network functionality required to support the new service-related applications. Such functionality includes detecting and reporting an incoming call from the network, initiating an outgoing call to the network, receiving a voice message from the network, sending a voice message to the network, collecting digits entered from the network, switching calls between channels, terminating calls, and detecting and reporting call termination.

The NAP includes a database including a voice file for storing predetermined digitized voice and tone messages to be applied to the network and voice messages received from the network to be re-applied thereto. The NAP may be implemented, for example, on an enterprise or mainframe computer (e.g., an A Series or Clearpath computer system commercially available from Unisys Corporation). The NAP may be implemented so as to use the standard parallel I/O processing capabilities, the Data Management System II (DMSII) and disk storage facilities and Direct I/O, as well as the communications capabilities such as Communication Management System (COMS) and Data Communications (DATACOM) of the A Series system. The applications communicate with the NAP through message-passing communication apparatus, such as the A Series COMS. The applications comprise a plurality of independent applications deployed by the telephone company to provide the desired services to the users.

The NAP includes three software modules collectively referred to as a Voice Network Management System (VNMS). The VNMS comprises an Application Interface Module (AIM), a Voice Message Management Module (VMMM), and a Network Interface Unit Manager (NIUM). (The NIUM includes the TSP Interp, CP Module, Call Record Manager (CRM) module, TSM module and Router module. The Router module handles communication from the TSM to the TSP Interp module. These components are described in greater detail below.) The VNMS resides in main memory of the computer system on which the NAP is installed. The applications communicate with the AIM through the COMS via multiple dialogs, each representing a logically distinct sequence of related messages. The messages within each dialog occur in pairs, with each pair comprising an AIM Command from an application requesting the NAP to perform a function and a response from the AIM to the application with appropriate status information or data, such as keyed-in caller digits or message number identification tokens. (In FIG. 2, the VNMS software is the entire package of AIM, CP, TSP INTERP, TSM, RFS and VMMM. With respect to the present invention, the protocol is controlled by VNMS TSP Interp. module and the TSP PRIM. This is described in greater detail below.)

The AIM is the point of communication between the NAP and the application(s) and directs the functionality of the NAP. Under the direction of the AIM, the VMMM controls sending and receiving digital voice messages between the NAP and the network. The AIM also communicates with the NIUM to receive digits from the network, such as DTMF digits; to receive status signals from the network; and to control call switching at the interface between the NAP and the network.

The NAP interfaces with the network through one or more NIUs. Each NIU comprises a computer-controlled, digital matrix switch that communicates with the lines and trunks of the network. The NIUs communicate with the voice message portion of the NAP via ports over a communication link comprising a conventional T1 or E1 digital voice link or trunk.

Predetermined voice messages, such as service offering prompts and instructions to callers, are stored on disk. These messages are accessed by the applications via the VMMM and transmitted over a voice channel through selected ports in the NIU or TSP. Voice messages from callers are stored on disk for re-transmission to the network under control of appropriate applications. The NIUM selects and connects the ports of the NIU or TSP under command of the applications and the VMMM controls the flow of the digital voice messages.

Central Office (CO) switches include the capability of detecting a predetermined number of ring-back or busy tones with respect to an incoming call and switching the incoming line to an outgoing line predetermined by the telephone company. Thus, for applications such as Call Answer, the CO can switch the call to a telephone number in the address space of the CO, for routing the call to the NAP so that the appropriate application can provide the service. Other services such as voice-mail and voice-store and forward use appropriate access telephone numbers in the address space of the CO to connect to the desired service. Based on configurable translation of information, such as the incoming port address and telephone number or other information transmitted to the NAP by the CO, the NIUM determines the appropriate application to utilize.

With the above summary description of the NAP as background, we will now describe in greater detail an exemplary implementation of the inventive process for preventing hung calls.

Exemplary Shared TSP Architecture

Figure 2:
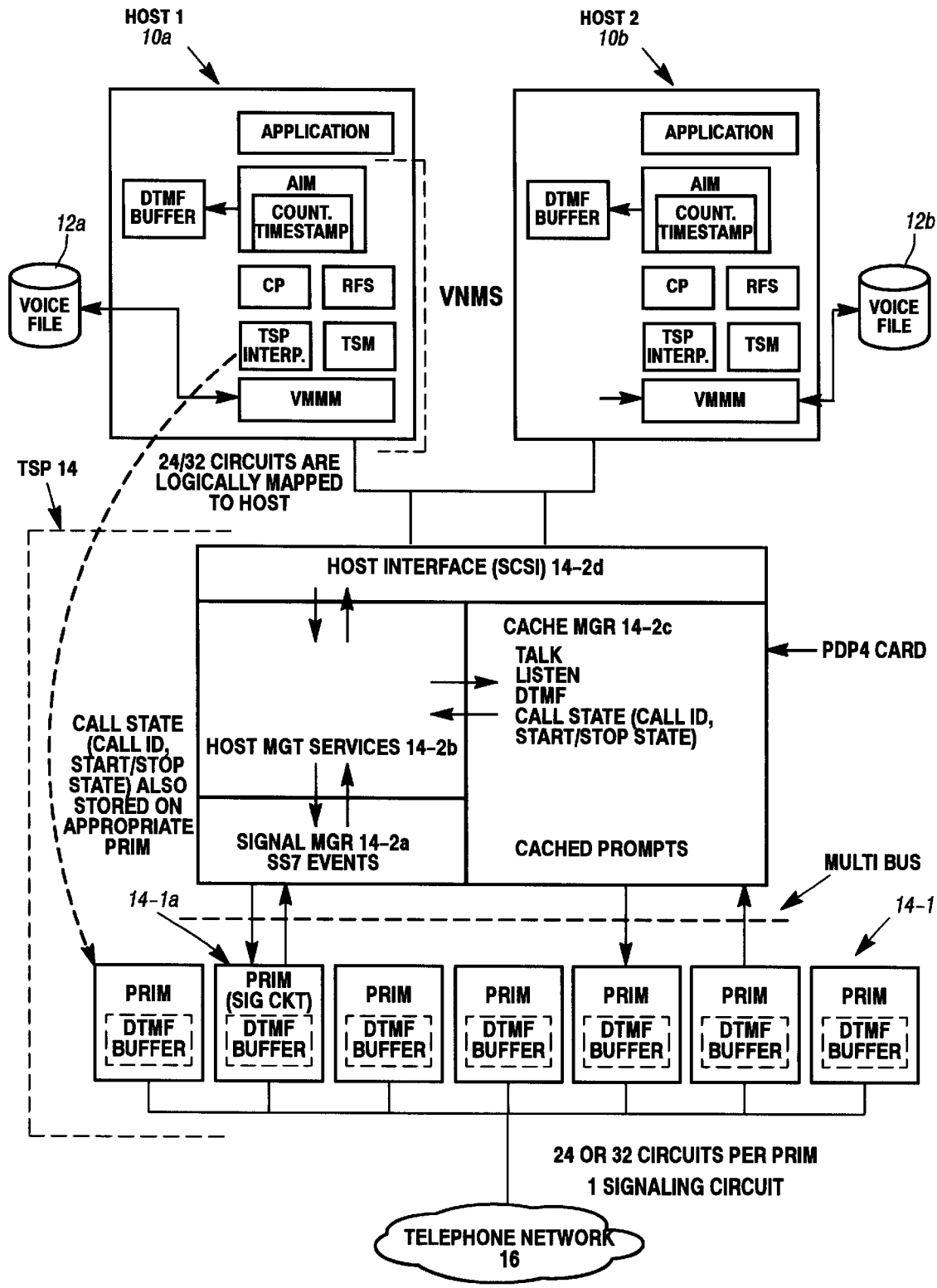
FIG. 2 is another view of the system of FIG. 1, illustrating further details of the presently preferred construction of the TSP(s) of the shared TSP implementation.

As shown in FIG. 2, each TSP 14 comprises one or more Primary Rate Interface Modules (PRIMs) 14-1 and a PDP4 Card 14-2. Each PRIM 14-1 interfaces a set of (e.g., 24 or 32) telephone circuits to the PDP4 card 14-2. In addition, one PRIM 14-1a is dedicated to signaling, and communicates with the PDP4 Card's Signaling Manager 14-2a, which in turn communicates with a Host Management Services (HMS) module 14-2b. The HMS module 14-2b communicates with a Cache Manager 14-2c and a Host Interface module 14-2d. The overall function of the TSP 14 is to logically map a plurality of telephone circuits (e.g., 24 or 32 telephone circuits per PRIM) among the respective hosts. The processes performed by the PRIM(s) 14-1, Signaling Manager module 14-2a, Host Management Services module 14-2b, Cache Manager module 14-2c and Host Interface module 14-2d are explained below. Briefly, however, it should be noted that an SS7 packet received at a PRIM is routed to the Signaling Manager 14-2a, which is the SS7 User Part (SS7 level 4). The Signaling Manager converts the SS7 packet to a proprietary message that is ultimately received by a host. Before sending the message to a host, the HMS module 14-2b selects the appropriate host.

The components of the TSP 14 employed in the presently preferred embodiment of the invention may be summarized as follows:

PRIM (Primary Rate Interface module) 14-1: The TSP PRIM module is used to send voice or receive voice from the network upon direction from the VNMS VMMM module (described below). It also is used to create hairpins (i.e., a connection of two voice ports to each other) upon direction from the VNMS TSP Interp Module.

Signaling Manager 14-2a: The Signaling Manager is used to communicate to the network using a country specific protocol such as SS7 or ISDN. It also communicates to the VNMS TSM module for circuit maintenance and the VNMS TSP Interp module for call control.

HMS (Host Management Services module) 14-2b: The TSP HMS module is used to centralize the TSP's handling of the shared TSP functionality. It insulates the rest of the TSP from the mechanics of switching calls from one host to another. It communicates to the VNMS TSP Interp module to transfer calls and the VNMS TSM module to configure the shared TSP environment. All TSP message traffic is routed through the HMS module.

CM (Cache Manager) 14-2c: The TSP CM module is used to provide a high speed buffering of commonly used voice messages to reduce demand on the VNMS VMMM module.

HIP (Host Interface Processor) 14-2d: The HIP board is used to communicate to the host operating system using a SCSI bus to transfer and receive buffers of data between the VNMS and TSP. It enforces the protocol on the TSP to collect messages in an efficient manner to transmit to the host and similarly breaks apart buffers from the host into messages that can be processed by other TSP modules.

In this exemplary embodiment of the system, the host computers 10a and 10b each include the following modules (not all of which are shown in FIG. 2):

VNMS (Voice Network Management System (VNMS)): The host-based software that routes incoming calls to the appropriate applications, routes outgoing calls to the appropriate ports, manages the recording and transmission of voice message, and tracks information about each call. A partial set of the VNMS modules include the Application Interface Module (AIM), the Voice Message Management Module (VMMM), the TSP Signaling Manager (TSM), the Remote Files System (RFS), and the TSP Interpreter (TSP Interp).

VMMM (Voice Message Management Module for TSP): The VNMS VMMM module handles the telephony media data, such as voice prompts, voice messages, fax messages and Speech Recognition vocabularies that are passed back and forth between VNMS and the TSP. The media data is stored in a file on disk. This file, called the voicefile, is simply a disk file used for media data. Pointers to the media data are maintained in a database called the Voice Input/Output database (VIODB). All activities performed by VMMM are directed by the VNMS AIM module according to the commands sent by network applications. The TSP CM module caches frequently used media message segments; VMMM does not have to pass media data to the TSP for every application send message command. The VMMM also communicates to the host operating system using a SCSI bus to send and receive buffers of messages to and from the TSP HIP module.

TSP Interp (TSP Interpreter): The VNMS TSP Interp module interprets signaling and event TSP messages using VNMS control and data structures. TSP signaling messages include the initiation, transfer and termination of calls. TSP event operations include incoming DTMF digit messages, purging and retrieving DTMF. TSP Interp uses a data structure called the call record to keep the attributes of a call. It will communicate to the VNMS CP module to handle application responses or requests. It will communicate to the VNMS VMMM module as appropriate to communicate to the TSP.

CP (Call Processing Module): The VNMS CP module provides the interface for call processing configuration. It receives requests from the TSP Interp or AIM module and sends requests to the TSP Interp or AIM module. The CP module uses the call record data structure and NDMDB database to decide how to permute digit fields, define application call types and other administrator defined functions.

NDMDB (Network Data Model Database): The VNMS NDMDB contains the administration defined configuration. During initialization the NDMDB is loaded into a set of memory data structures called turbo arrays. The turbo arrays are used to retrieve information during call processing.

TSM (TSP Signaling Manager): The VNMS TSM module is used to accept all messages from the TSP that are not telephony media related. TSM distributes all signaling and event messages to the TSP Interp, all remote file system commands to the RFS module and processes all circuit maintenance operations itself. Circuit maintenance operations handle the suspending and resuming network circuits.

AIM (Application Interface Module): The VNMS AIM module translates high level application commands from each application to functions specific to each of the other modules in NAP such as VMMM and CP. It also translates VNMS function calls from the lower layers of VNMS to application responses. AIM interfaces with one or more network applications (NAs) through standard host interfaces. For example, the Send Message command plays a message, optionally records a message, and collects DTMF digits. AIM reports results of command execution back to the application by way of response. These commands and responses carry with them unique dialog Ids, assigned by AIM, that associate them with a call.

RFS (VNMS Remote File System): The VNMS RFS module is a service module for the TSP and acts as a file server for TSP data, such as tracing and configuration definitions. The RFS module is required during TSP initialization for the TSP to obtain all its code and initial data value.

Thus, as shown, each TSP is connected to certain "ports" of the telephone network. A call coming into a given port is received by the TSP connected to that port. Specifically, a call comes into a PRIM board in the TSP, and the Signaling Manager on the PDP4 card of that TSP routes the call to the Host Management Services (HMS) module 14-2b (see FIG. 2). The call comes in on a reserved signaling channel 14-1a of the PRIM and is immediately transferred to the Signaling Manager 14-2a on the PDP4 board. The signaling manager reformats the call packet and gives it to the HMS module 14-2b, which in turn gives it to the Host Interface Module 14-2d. The Host Interface Module 14-2d places the call on the SCSI bus. The VNMS VMMM module takes the call from the SCSI bus and submits it to the TSP Interp module (via the TSM), which creates the call record. The TSP Interp module gives the call to the CP module that sits between the AIM and TSP Interp, which interrogates the database information in memory, to obtain the necessary information (via digit fields supplied from the network) to route the call to the proper application. The CP module then queues the call to the application interface module (AIM). The AIM dequeues the call and gives it to the specified application.

Each new incoming call is assigned a TSP identifier, a PRIM identifier, and a channel identifier. The HAMS module 14-2b uses a routing algorithm to route the new call to one of the hosts. For example, a simple round-robin algorithm may be used. If a subsequent call comes in with the same TSP, PRIM, and channel identifiers, it is routed to the host that last processed a call for this same TSP, PRIM, and channel instance. Once the TSP has routed a call to a particular host, it assumes that the host is handling the call.

When the VNMS on a host receives an incoming call from a TSP 14, a determination is made as to whether that host and/or application can process the call. For example, the VNMS may perform call-type mapping to determine if the application running on it is capable of processing the call. If so, it passes the call to the application for handling. The application itself can also determine whether to process a given incoming call. If either the VNMS or the application determines that the call cannot be processed on the host, a request can be issued to the TSP to transfer the call to another host. The Inter-System Call Transfer process is described in U.S. patent application Ser. No. 09/307,014, filed May 7, 1999, "Inter-System Call Transfer."

As discussed above, the present invention particularly relates to a mechanism for preventing hung calls. An important characteristic of a messaging system, such as a voice messaging system, is that it be highly reliable and able to quickly recover from system failures and malfunctions. This characteristic is generally referred to as system "availability," since such failures and malfunctions can make the system unavailable to some or all subscribers. The present invention relates to a messaging system architecture that preferably (but not necessarily) comprises multiple redundant messaging nodes/hosts in order to achieve high availability. A problem that has burdened prior voice messaging system, and which we believe could be aggravated by the use of multiple shared hosts, is that a circuit of a Telephony Services Platform (TSP) or Network Interface Unit (NMU) can become "hung" due to race conditions and/or hardware, software malfunctions (or bugs) or component failures. For example, in the normal operation of the prior voice messaging system, when a call is received on a particular circuit or channel of a TSP (actually, the call is received by a Primary Rate Interface Module (PRIM) on the TSP), a TSP Interp. module of the host computer assigns the call a Call ID and initiates a call at the TSP by means of a new group ("Allow Group") command with a Start bit flag set. When the call is terminated, an end group ("Terminate Group") command with a Stop bit flag is sent, which indicates to the TSP that the circuit in question is available to receive new calls.

When a malfunction occurs, the circuit can become "hung" because the TSP does not receive the expected sequence of Start and Stop bits. In this case, the circuit can remain unavailable to callers for extended periods (i.e., until the system is reset, which could take hours or even days).

The following section describes a system and process for preventing hung calls in accordance with the present invention.

Exemplary System and Process for Preventing Hung Calls

The present invention provides a method for preventing hung calls of the type described above. In particular, the invention provides a protocol or process for preventing hung calls on the VNMS and the TSP PRIM(s) during protocol violations. (A protocol violation is an instance where the normal voice processing protocol becomes out of sync due to a hardware or software failure in VNMS, the TSP (or one of the TSPs), or the path between the TSP and VNMS.) The invention is particularly useful in a shared TSP environment but has applicability in a non-shared TSP environment. The basic premise is that the VNMS unique Call ID (unique across all hosts) is used to communicate to the PRIM in either an Allow Group or Hairpin operation (i.e., where two ports are connected so that a call is transferred to another party, independent of VNMS).

An "Allow Group" operation is used to tell the TSP PRIM board that voice processing is allowed to start on a particular channel. It is normally the first operation sent to the PRIM when a new call arrives. In older TSP implementations, this was the sole method to let the PRIM know that voice processing was allowed on the channel. If an Allow Group operation had already been sent, the TSP ignored any new Allow Group commands and the channel was hung. With the present invention, the Allow Group operation has been modified to contain the Call ID and a set of flags that include the Start and Stop bits. Thus, now the PRIM can make its own determination whether it should honor the Allow Group or force a call tear down due to a break in the protocol.

In the presently preferred implementation of the invention, a Call ID is a concatenation of two fields, a "Host ID" and a unique 32-bit integer, and takes the following form:

| | | |
|---|---|---|
| Call ID Host | 16 bits | Theoretical Maximum is 65535 hosts |
| Call ID Unique ID | 32 bits | Theoretical Maximum number is 4294967295 |

If the VNMS processes 100 calls a second (8640000 calls in one day), then a 32-bit integer would still take approximately 497 days before the number returns to 0. The original Call ID assigned during the receipt of the call from the network is maintained during call transfers from host to host. The revision level 1 TSP Operations for Allow Group, Terminate Group, Hairpin and Clear Hairpin contain the VNMS Call ID.

A Start Bit on the Allow Group (start voice op) or Hairpin (connect two network side ports) indicates that the call is new. A Stop Bit on the Terminate Group indicates that the call is over. If a new call is sent to the PRIM on channel X and:

(a) there is no call in progress, then the call is accepted and the PRIM allows voice to be played or a hairpin to be performed using channel X.

For the next two cases assume that a Call ID "A" exists on the PRIM on channel X.

(b) if the PRIM is given an Allow Group or Hairpin op with the same Call ID "A" and the Start Bit set for channel X,
then the call in progress is kept and the new call is rejected.

(c) if the PRIM is given an Allow Group or Hairpin with a new Call ID "B" with the Start Bit set for channel X, then the Call ID "A" in progress is cleared and the new call B is rejected. Both calls are discontinued because the PRIM can not determine reliably which call it should allow to continue. But the next Call ID "C" that has the start bit set is then accepted.

In general, the case (b), where an Allow Group or Hairpin is given with the same Call ID A and the Start bit is set, should never occur. It might occur due to programming errors induced because of unexpected race conditions, It is possible that a call could be transferred from one host A to another host B because host A is unresponsive. However, if host A wakes up unexpectedly, then it could attempt to process the same call as host B (i.e., same Call ID). Normally the shared TSP protocols will disallow the processing of the same call from host A, and the VNMS TSP Interp module will not set the Start bit again on host A. This could happen, however, if programming errors are exposed, perhaps when encountering protocol violations due to unanticipated race conditions. For example, a single call using multiple hosts might experience temporary outages on one or more hosts.

The net result of all this is a protocol to overcome protocol violations so that an outage can be avoided.

The present invention uses a new feature of the TSP, i.e., the Call ID and start and stop bits to implement the recovery. In the prior system, an Allow Group/Terminate Group pair or a Hairpin/Clear Hairpin pair comprised a complete call entity as far as the TSP was concerned. In the present invention, the new Call ID uniquely defines a call with respect to the Shared TSP environment. A call may consist of multiple sequential Allow Group/Terminate Group and Hairpin/Clear Hairpin components. A call is established for a specific channel by setting the Start bit in an Allow Group or Hairpin operation. The same call continues through multiple sequential instances of Allow Group/Terminate Groups and Hairpin/Clear Hairpins until it is closed by the receipt of a Terminate Group or Clear Hairpin with the Stop bit set. This enables tracking of a complete call on the part of the TSP. Thus, a number of conditions are possible.

In the following table, for purposes of the protocol, Hairpin/Clear Hairpin pairs may be substituted for Allow Group/Terminate Group pairs with the exception noted below:

| Occurrence | State | Action | End Result |
|---|---|---|---|
| Allow Group received with Start bit set | Call in progress, same Call ID | Reject Allow Group but retain call in progress | Call in progress |
| | Call in progress, different Call ID | Reject Allow Group and abort call in progress | No call in progress |
| | No Call in progress | Accept Allow Group | Call in progress, allow in progress |
| Allow Group received w/o Start bit set | No Call in progress | Reject Allow Group | No call in progress |
| | Call in progress with different Call ID | Reject Allow Group | Original call still in progress |
| | Call in progress with same Call ID | Accept Allow Group | Call in progress, allow in progress |
| Terminate Group received with Stop bit set | No Call in progress | Reject Terminate Group | No call in progress |
| | Call in progress with different Call ID | Reject Terminate Group | Call in progress |
| | Call in progress with same Call ID | Accept Terminate group | No call in progress |

-continued

| Occurrence | State | Action | End Result |
|---|---|---|---|
| Terminate Group received w/o Stop bit set | No Call in progress | Reject Terminate Group | No call in progress |
| | Call in progress with different Call ID | Reject Terminate Group | Call in progress |
| | Call in progress with same Call ID | Accept Terminate Group, terminate Allow Group but not call | Call in progress |
| | Terminate Group received w/ Hairpin in progress or Clear Hairpin received w/ Allow Group in progress | Reject Terminate Group or Clear Hairpin | Call in progress |

For the cases above where, due to unforeseen protocol or system errors, a call might not be terminated correctly, note that initiating a new call with the Start bit set will terminate the call in progress as well as reject the call being initiated. This allows the system to safely disconnect (although somewhat abruptly from the customer's point of view) any call in progress before initiating a new call, thus ensuring the security and privacy of each call.

As a further safety measure, to avoid hung channels, a variation of the Terminate Group using an override bit can be issued by the host. This uses a special reserved Call ID and will unconditionally terminate a call for a given channel, regardless of the Call ID in use and the state of the call (Hairpin, Allow Group, or in between groups).

Figure 3:
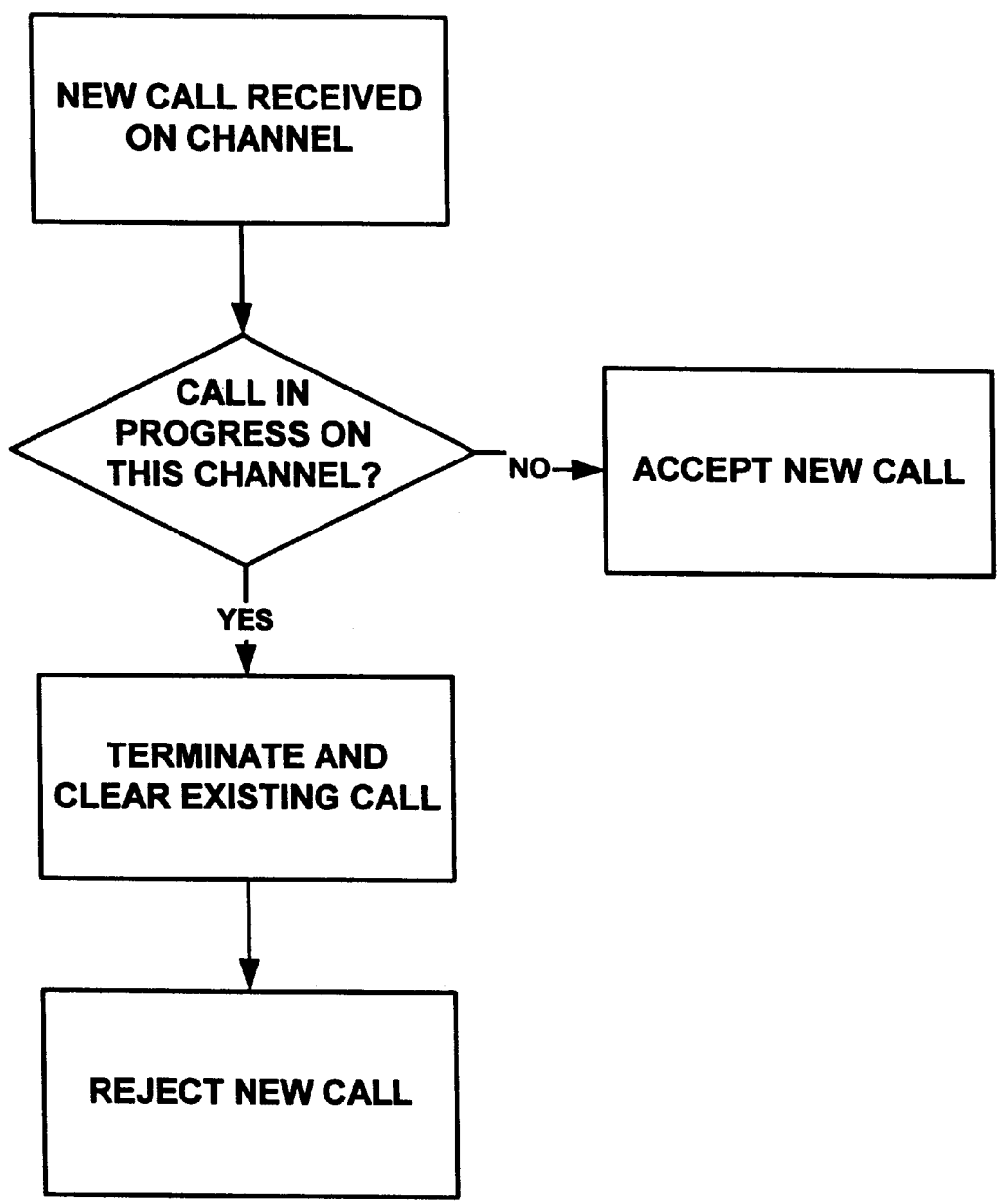
FIG. 3 is a flowchart of a method in accordance with the present invention.

FIG. 3 is a flowchart summarizing the present invention. As shown, after a new call is received on a given circuit or channel of a PRIM 14-1 (see FIG. 2), the system determines whether a call is already in progress on this channel. If not, the new call is accepted. On the other hand, if a call is in progress on the same channel as the one that just received the new call, the existing call is terminated and cleared from the PRIM. Finally, the new call is rejected. This clears the channel for any new incoming calls. The end result of this process is that no channel is hung so completely that it cannot be recovered, and no protocol error on the part of the host results in multiple calls on the same channel. Moreover, the invention avoids cross connection of calls such that customers using a channel can find themselves listening to someone else'ss call.

CONCLUSION

In sum, the present invention provides a process for preventing hung calls and thus enhances system availability, particularly with respect to a telephone-based messaging system in which NIUs or TSPs are shared by multiple host computers. It is understood, however, that the invention is susceptible to various modifications and alternative constructions. It should be understood that there is no intention to limit the invention to the specific constructions described herein. On the contrary, the invention is intended to cover all modifications, alternative constructions, and equivalents falling within the scope and spirit of the invention.

It should also be noted that the present invention may be implemented in a variety of messaging applications, including telephony-based messaging systems (including but not limited to NAP-based voice messaging systems). The various techniques described herein may be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language may be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system may also be considered to be implemented as a computer-readable storage medium, configured with a computer program, where the storage medium so configured causes a computer to operate in a specific and predefined manner.

We claim:

1. A method for preventing hung calls on a channel of a network interface device (NID), the NID being interfaced from at least one host to a telephone network, the method comprising the acts of:

receiving on a channel of the network interface device a new incoming call from the telephone network;

assigning a substantially unique and host independent data structure (Call ID) to said new incoming call;

determining whether another call is already in progress on said channel; and if no other call is in progress on said channel, accepting the new incoming call for processing on said channel;

if another call is already in progress on said channel, terminating the other call and rejecting the new incoming call, whereby said channel is made ready to accept any subsequent calls received on said channel.

2. A method as recited in claim 1, wherein the NID is part of a telephony-based voice messaging system.

3. A method as recited in claim 1, wherein the NID is a Network Interface Unit (NIU).

4. A method as recited in claim 1, wherein the NID is a Telephony Services Platform (TSP).

5. A method as recited in claim 4, wherein the method is used in a shared TSP environment.

6. A method as recited in claim 1, wherein the method is used in a voice messaging system of the type in which said at least one host computers is interfaced to the telephone network by the NID, and wherein a prescribed operation (Allow Group) involves a one of said at least one host computers providing a first data structure (Call ID) to the NID, wherein the first data structure further includes a first bit (Start) and a second bit (Stop), which the NID employs to determine whether to permit the new call to be processed on said channel or instead to terminate said other call and reject the new incoming call.

7. A method as recited in claim 6, wherein the first data structure (Call ID) comprises a first field (Host ID) that is host unique by uniquely identifying a one of said at least one host computers and wherein a second field provides said substantial uniqueness by providing a unique 32-bit integer that uniquely identifies a telephone call.

8. A method as recited in claim 6, wherein the first (Start) bit identifies a call that is new, and the second (Stop) bit identifies a call that is terminated.

9. A method as recited in claim 6, wherein, if a new call is sent to the NID on a given channel (Channel X) and there is no call in progress, than the call is accepted and the NID allows voice to be played using the given channel (Channel X).

10. A method as recited in claim 9, wherein, if a first Call ID (A) exists on the NID on the given channel and if the NID is provided an Allow Group with the same Call ID (A) and the first bit (Start) is set for the given channel, then the call in progress is maintained and the new call is rejected, whereas, if the NID is provided an Allow Group with a new Call ID (B) with the first bit (Start) set for the given channel, then the call in progress corresponding to the first Call ID (A) is cleared and the new call is rejected.

11. A computer readable storage medium comprising executable program code for carrying out the following method to prevent hung calls on a channel of a network interface device (NID) interfaced to a telephone network and to at least one host computer, the method comprising:

receiving on a channel of the network interface device a new incoming call from the telephone network;

assigning a substantially unique and host independent data structure (Call ID) to said new incoming call;

determining whether another call is already in progress on said channel; and if no other call is in progress on said channel, accepting the new incoming call for processing on said channel;

if another call is already in progress on said channel, terminating the other call and rejecting the new incoming call, whereby said channel is made ready to accept any subsequent calls received on said channel.

12. A computer readable storage medium as recited in claim 11, wherein the host computer is interfaced to the telephone network by the NID, and wherein a prescribed operation (Allow Group) involves at least one of said at least one host computers providing a first data structure (Call ID) to the NID, wherein the first data structure includes a first bit (Start) and a second bit (Stop), and a unique across all hosts Call ID which the NID employs to determine whether to permit the new call to be processed on said channel or instead to terminate said other call and reject the new incoming call.

13. A computer readable storage medium as recited in claim 12, wherein the first data structure (Call ID) comprises a first field (Host ID) that uniquely identifies the host computer and a second field containing a unique 32-bit integer that uniquely identifies a telephone call.

14. A computer readable storage medium as recited in claim 12, wherein the first (Start) bit identifies a call that is new, and the second (Stop) bit identifies a call that is terminated.

15. A computer readable storage medium as recited in claim 12, wherein, if a new call is sent to the NID on a given channel and there is no call in progress, then the call is accepted and the NID allows voice to be played using the given channel.

16. A computer readable storage medium as recited in claim 15, wherein, if a first Call ID (A) exists on the NID on the given channel and if the NID is provided an Allow Group with the same Call ID (A) and the first bit (Start) is set for the given channel, then the call in progress is maintained and the new call is rejected, whereas, if the NID is provided an Allow Group with a new Call ID (B) with the first bit (Start) set for the given channel, then the call in progress corresponding to the first Call ID (A) is cleared and the new call is rejected.

17. A telephony-based voice messaging system, comprising:

a host computer; and a network interface device (NID) operatively coupled to the host computer, wherein the system is programmed to prevent hung calls on a channel of the NID when the NID is interfaced to a telephone network, the programmed process for preventing hung calls comprising the acts of:

receiving on a channel of the NID a new incoming call from the telephone network;

assigning a substantially unique and host independent data structure (Call ID) to said new incoming call;

determining whether another call is already in progress on said channel; and if no other call is in progress on said channel, accepting the new incoming call for processing on said channel;

if another call is already in progress on said channel, terminating the other call and rejecting the new incoming call, whereby said channel is made ready to accept any subsequent calls received on said channel.

18. A system as recited in claim 17, wherein the NID is a Telephony Services Platform (TSP).

19. A system as recited in claim 18, further comprising a second NID interfaced to the host computer.

20. A system as recited in claim 17, wherein a prescribed operation (Allow Group) of the system involves the host computer providing the first data structure (Call ID) to the NID, wherein the first data structure includes a first bit (Start) and a second bit (Stop), which the NID employs to determine whether to permit the new call to be processed on said channel or instead to terminate said other call and reject the new incoming call.

21. A system as recited in claim 20, wherein the first data structure (Call ID) comprises a first field (Host ID) that uniquely identifies the host computer and a second field containing a unique 32-bit integer that uniquely identifies a telephone call.

22. A system as recited in claim 20, wherein the first (Start) bit identifies a call that is new, and the second (Stop) bit identifies a call that is terminated.

23. A system as recited in claim 20, wherein, if a new call is sent to the NID on a given channel (Channel X) and there is no call in progress, then the call is accepted and the NID allows voice to be played using the given channel (Channel X).

24. A system as recited in claim 23, wherein, if a first Call ID (A) exists on the NID on the given channel and if the NID is provided an Allow Group with the same Call ID (A) and the first bit (Start) is set for the given channel, then the call in progress is maintained and the new call is rejected, whereas, if the NID is provided an Allow Group with a new Call ID (B) with the first bit (Start) set for the given channel, then the call in progress corresponding to the first Call ID (A) is cleared and the new call is rejected.

* * * * *